US005574569A

United States Patent [19]
Utsumi et al.

[11] Patent Number: 5,574,569
[45] Date of Patent: Nov. 12, 1996

[54] IMAGE SIGNAL TRANSMISSION APPARATUS FOR REPEATEDLY REPRODUCING AND TRANSMITTING A MAIN IMAGE AND A SUB-IMAGE USING AN OPTICAL DISC

[75] Inventors: Kuniaki Utsumi; Kazuki Maeda, both of Osaka, Japan

[73] Assignee: Matsushita Electric Industrial Co., Ltd., Osaka, Japan

[21] Appl. No.: 345,933

[22] Filed: Nov. 28, 1994

Related U.S. Application Data

[63] Continuation-in-part of Ser. No. 987,660, Dec. 9, 1992, Pat. No. 5,432,767.

[30] Foreign Application Priority Data

Dec. 12, 1991 [JP] Japan .................. 3-328721

[51] Int. Cl.⁶ .................................. H04N 5/76
[52] U.S. Cl. .................. 386/95; 358/335; 386/108; 386/126
[58] Field of Search .................. 358/335, 342; 360/15; 369/48, 32, 47, 54; H04N 5/76

[56] References Cited

U.S. PATENT DOCUMENTS

| 4,203,130 | 5/1980 | Doumit et al. | 348/96 |
| 4,817,075 | 3/1989 | Kikuchi et al. | 369/47 |
| 5,367,510 | 11/1994 | Ando | 369/32 |
| 5,430,697 | 7/1995 | Bu | 369/32 |
| 5,434,829 | 7/1995 | Maeda et al. | 369/48 |
| 5,436,878 | 7/1995 | Yamaguchi et al. | 369/47 |

OTHER PUBLICATIONS

Nihon Keizai Shinbun, Mar. 15, 1992 (with Partial Translation).
IEEE Global Telecommunication Conference & Exhibitions, Conference Record vol. 1 of 3, Dec. 2–5, 1990.

*Primary Examiner*—Thai Q. Tran
*Assistant Examiner*—Y. Lee
*Attorney, Agent, or Firm*—Price, Gess & Ubell

[57] ABSTRACT

The present invention provides an optical disc comprising a main-image signal recording area holding a signal of a main image for a display, and a sub-image signal recording area holding a signal of a sub image to be displayed including an image of a time counted down in accordance with a progress of a sub-image signal reproduction. Furthermore it provides an image signal transmitting apparatus for repeatedly transmitting a main-image signal and a sub-image signal one after the other by utilizing such optical disc, the image signal transmitting apparatus comprising a image signal reproduction device for reproducing the main-image signal and the sub-image signal, a cycle time memory for memorizing a main-image signal transmission cycle, and a control device for obtaining a time difference between the cycle and time required for the main-image signal reproduction as well as control the image signal reproduction device.

13 Claims, 10 Drawing Sheets

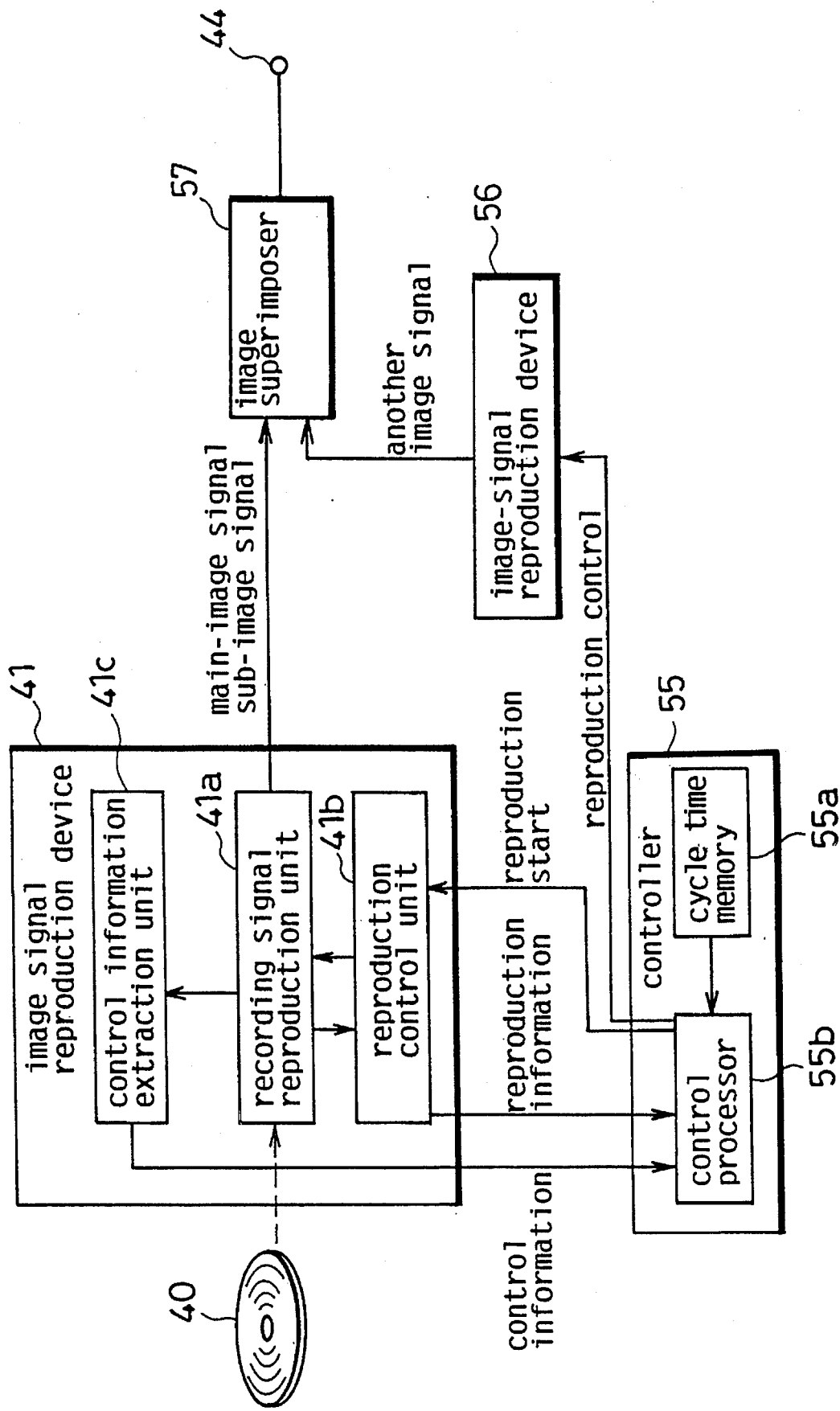

IMAGE SIGNAL TRANSMISSION APPARATUS FOR REPEATEDLY REPRODUCING AND TRANSMITTING A MAIN IMAGE AND A SUB-IMAGE USING AN OPTICAL DISC

This application is a continuation-in-part of U.S. patent application Ser. No. 07/987,660, filed on Dec. 9, 1992, now U.S. Pat. No. 5,432,767.

BACKGROUND OF THE INVENTION (1) Field of the Invention

The present invention relates to an optical disc holding an image signal, an image signal transmitting apparatus utilizing such optical disc and an image signal transmitting method, which are mainly applied to a broadcasting system including a cable television service (CATV) for broadcasting repeatedly an image at a certain cycle.

(2) Description of the Related Art

Recently a service for broadcasting repeatedly a single program at a fixed cycle has been provided so that viewers can watch the program whenever they want. The cycle is usually fixed to be longer than the time required for the reproduction of the program to be broadcasted, therefore no image or a still picture showing a start time of the next reproduction of the program appears at an interval between reproductions of the program.

In order to broadcast the program and the still picture one after the other, an apparatus is constructed as shown in FIG. 1. Such device is equipped with an image signal reproduction device 11 for reproducing a signal of the program, a still picture signal generation device 12 for generating a signal of the still picture to display the start time of the program, a selector 13 for selecting either the program signal or the still picture to be outputted to an output terminal 14, and a controller 15 for controlling the devices 11 through 14.

A control by the controller 15 is operated as described hereunder. When the program is being reproduced, the controller 15 controls the image signal reproduction device 11 and the selector 13 so that the image signal reproduction device 11 reproduces the program signal while it is selected by the selector 13 to be outputted to the output terminal 14. When the reproduction of the program is completed, the controller 15 controls the still picture signal generation device 12 and the selector 13 so that the still picture signal generation device 12 generates the still picture signal while it is selected by the selector 13 to be outputted to the output terminal 14. Such control is repeated at a fixed cycle so that the program is provided at the fixed cycle.

However, the information provided by the above apparatus is simply what the viewers get from a program schedule table despite that the above apparatus needs additional devices such as the still picture signal generation device 12, the selector 13, and the controller 15.

In order to broadcast an image more useful than the still picture, another apparatus is conceivable. As shown in FIG. 2, the apparatus is equipped with a time display image signal generation device 22 instead of the still picture signal generation device 12, for generating a signal of an image to display a waiting time for next reproduction of the program.

Further, another apparatus is conceivable, As shown in FIG. 3 the apparatus is equipped with another image signal reproduction device 36 and an image superimposer 37. The reproduction device 36 and the image superimposer 37 are operated so that image superimposer 37 superimposes the waiting-time display on a background image, including a commercial image, reproduced by the image signal reproduction device 36.

The apparatuses in FIG. 2 and 3 have an advantage of informing viewers of the waiting time for the next reproduction of the program; furthermore, the latter apparatus has an additional advantage of providing various information by superimposing the waiting-time display on another image. However, the complicated construction of the apparatus in FIG. 1, which is the drawback thereof, still remains in the apparatuses in FIG. 2 and 3.

SUMMARY OF THE INVENTION

It is a primary object of the present invention to provide an optical disc holding the signal of the program, which enables a simply constructed image signal transmitting apparatus to transmit the program in a repeated manner having a fixed interval, in addition to transmitting an image displaying the waiting-time for the next reproduction of the program. Hereafter, the program to be provided is referred to as a main image, relevant for a series of images composing the program.

It is another object of the invention to provide the image signal transmitting apparatus for transmitting the image by utilizing such optical disc, and the image signal transmitting method.

The above objects are fulfilled by an image signal transmission apparatus for repeatedly reproducing and transmitting a main image and a sub-image, using an optical disc which has a main image storage area which stores the main image, a sub-image storage area which stores a time display which shows a time progressively counting down until a remaining time is zero, and a control information storage area which stores control information such as an end address in the sub-image storage area, a main image reproduction time, and an end address in the main image storage area, comprising: a control information acquisition unit for acquiring the end address of the sub-image stored area and the reproduction time, the start address and the end address of the main image from the control information storage area of the optical disc when the optical disc is set; a timer which is set an expected necessary time for moving a reproduction head; a cycle memory unit for storing a cycle which transmits a main image signal; a calculation unit for calculating a sub-image reproduction required time from the cycle, the main image reproduction time and the set time in the timer, and at the same time finding a sub-image reproduction start address from the sub-image reproduction required time and the end address in the sub-image storage area; a timer activation unit for turning on the timer when data in the end address of the main image has been reproduced by the reproduction head; and a control unit for moving the reproduction head to the sub-image reproduction start address found by the calculation unit when the reproduction head has finished reproducing the end address in the main image, and for starting reproduction again from the sub-image reproduction start address having waited for the set time in the timer to expire.

The calculation unit may include a calculator which executes a calculation given below to find the sub-image reproduction start address;

$$Ts = CT - MT \qquad (1)$$

$$SsA = LsA - (Ts - \alpha).K \qquad (2)$$

when in equation (1), Ts is a time assigned to the reproduction of a sub-image, CT is the cycle, and MT is the main image reproduction time, and in equation (2) SsA is the sub-image reproduction start address, LsA is the end address for the sub-image, K is a coefficient of conversion from time into an address number, and $\alpha$ is the set time in the timer.

The timer activation unit may include an address retrieval unit for retrieving the end address of the main image reproduced by the reproduction head.

The main image storage area may be arranged so as to follow after the sub-image storage area on the optical disc, wherein the time set in the timer is set so as to be at least as long as a time taken for the reproduction head to move from the end address of the main image to the start address of the sub-image.

The image signal transmission apparatus may further comprise an image signal generation unit for generating a third image signal aside from the main image and the sub-image; and an image superimposing unit for superimposing onto the third image generated by the image signal generation unit the time image of the sub-image signal; wherein the control unit controls the image signal generation unit so as to generate the third image signal, while, in addition, having the sub-image signal reproduced.

The objects stated above are also be fulfilled by an image signal transmission apparatus for repeatedly reproducing and transmitting a main image and a sub-image, using an optical disc which has a main image storage area which stores the main image, a sub-image storage area which stores a time display which shows a time progressively counting down until a remaining time is zero, and a control information storage area which stores control information such as an end address in the sub-image storage area, a main image reproduction time, and an end address in the main image storage area, with the sub-image storage area arranged so as to come after the main image storage area, comprising: a control information acquisition unit for acquiring the end address of the sub-image stored area and the reproduction time, the start address and the end address of the main image from the control information storage area of the optical disc when the optical disc is set; a first timer for being set a time which is at least as long as a time taken to move a reproduction head from the main image to the sub-image; a second timer for being set a time which is as least as long as a time taken to move the reproduction head from the sub-image to the main image; a cycle storage unit for storing a cycle for sending a main image signal; a calculation unit for calculating a sub-image reproduction required time from the cycle, the main image reproduction time and the set times in the first and second timers, and at the same time finding a sub-image reproduction start address from the sub-image reproduction required time and the end address in the sub-image storage area; a timer activation unit for activating the first timer when the reproduction head has reproduced data in the end address of the main image, and for activating the second timer when the reproduction head has reproduced data in the end address of the sub-image; and a control unit for moving the reproduction head to the sub-image reproduction start address found by the calculation unit and, having waited for the set time in the first timer, starting reproduction of data at the sub-image reproduction start address, when the reproduction head has finished the reproduction of the end address of the main image, and for moving the reproduction head to the reproduction start address of the main image and, having waited for the set time in the second timer, starting the reproduction of data at the main image start address, when the reproduction head has finished the reproduction of the end address of the sub-image.

The calculation unit may include a calculator which executes a calculation given below to find the sub-image reproduction start address;

$$Ts = CT - MT \qquad (3)$$

$$SsA = LsA = (Ts - \alpha - \beta) \cdot K \qquad (4)$$

when in equation (3), Ts is the sub-image reproduction required time, CT is the cycle, and MT is the reproduction time of the main image, and in equation (4) SsA is the sub-image reproduction start address, LsA is the sub-image end address, K is a coefficient for a conversion from time into an address number, $\alpha$ is the set time in the first timer and $\beta$ is the set time in the second timer.

The timer activation unit may include an address retrieval unit for retrieving that the reproduction head is reading the end address of the main image and the sub-image.

The image signal transmission apparatus may further comprise an image signal generation unit for generating a third image signal aside from the main image and the sub-image; and image superimposing unit for superimposing onto the third image generated by the image signal generation unit the time image of the sub-image signal; wherein the control unit may control the image signal generation unit so as to generate the third image signal, while, in addition, having the sub-image signal reproduced.

The objects stated above are also fulfilled by an image signal transmission apparatus for repeatedly reproducing and transmitting a main image and a sub-image, using an optical disc which has a main image storage area which stores the main image, a sub-image storage area which stores a time display which shows a time progressively counting down until a remaining time is zero, and a control information storage area which stores control information such as an end address in the sub-image storage area, a main image reproduction time, and an end address in the main image storage area, with the sub-image storage area arranged so as to come after the main image storage area, comprising: a control information acquisition unit for acquiring the end address of the sub-image and the reproduction time, the start address and the end address of the main image from the control information storage area of the optical disc when the optical disc is set; a cycle storage unit for storing a cycle for transmitting a main image signal; a timer which is set a time difference between the cycle and the reproduction time of the main image; a calculation unit for calculating a calculated sub-image reproduction required time from the cycle, the reproduction time of the main image, the set time in the timer and a time longer than a time to move a reproduction head from the main image to the sub-image as well as a time longer than a time to move the reproduction head from the sub-image to the main image, and for finding a reproduction start address for the sub-image from the end address in the sub-image storage area and the calculated sub-image assigned reproduction time; a timer activation unit for activating the timer when the reproduction head has reproduced the end address of the main image; and a control unit for moving the reproduction head to the reproduction start address of the sub-image found by the calculation unit and starting the reproduction of data at the reproduction start address of the sub-image, when the reproduction head has finished the reproduction of the end address of the main image, and for moving the reproduction head to the reproduction start address of the main image and, having waited for the set time in the timer, starting the reproduction of data at the start address of the main image, when the reproduction head has finished the reproduction of the end address of the sub-image.

The timer may be set a time taken between a reproduction of the last address of the main image and a next reproduction of the starting address of the main image, and the calculation unit may include a calculation unit which executes a calculation given below to find the reproduction start address;

$$\gamma = CT - MT(=Ts) \quad (5)$$

$$SsA = LsA - (\gamma - HT1 - HT2).K \quad (6)$$

when in equation (5), $\gamma$ is a time set in the timer, CT is the cycle, and MT is the reproduction time of a main image, and in equation (6), SsA is the reproduction start address of the sub-image, LsA is the end address for the sub-image, HT1 is a time period somewhat longer than a time taken by the reproduction head to move from the main image to the sub-image, HT2 is a time period somewhat longer than a time taken by the reproduction head to move from the sub-image to the main image, and K is a coefficient for conversion from time into an address number.

The timer activation unit may include a retrieval unit for retrieving that the reproduction head is reading the end address of one of the images.

The image signal transmission apparatus may further comprise an image signal generation unit for generating a third image signal aside from the main image and the sub-image and an image superimposing unit for superimposing onto the third image generated by the image signal generation unit the time image of the sub-image signal; wherein the control unit may control the image signal generation unit so as to generate the third image signal, while, in addition, having the sub-image signal reproduced.

The optical disc constructed as above makes it possible to transmit the sub-image which displays the waiting time for next reproduction of the main image, simply by reproducing the sub-image signal recorded at the fixed place in the sub-image signal recording area. Hence, the image signal transmitting apparatus which utilizes such optical disc has an advantage of excluding a generation device for generating the sub-image signal and a control device for controlling the generation device, and another advantage of transmitting main image signals of various reproduction times and transmission cycles.

The main image signal recording area may be placed immediately after the sub-image signal recording area in a reproduction direction, or the sub-image signal single recording area may be placed after the main image signal recording area in such direction. In the former case, the reproduction is as simple as reproducing signals recorded between the fixed point in the sub-image signal recording area and the end point of the main image recording area. In the latter case, the optical disc is compatible with a general optical disc since a reproduction of the optical disc starts with the main image reproduction even when it is conducted by a general reproduction apparatus.

Also, the sub-image may be superimposed on another image. A signal of such image is recorded outside the optical disc and is reproduced for the background of the sub-image.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 8 is a block diagram showing the image signal transmitting apparatus in Embodiment 3 of the present invention.

DESCRIPTION OF THE PREFERRED EMBODIMENTS

[EMBODIMENT 1]

Figure 1:
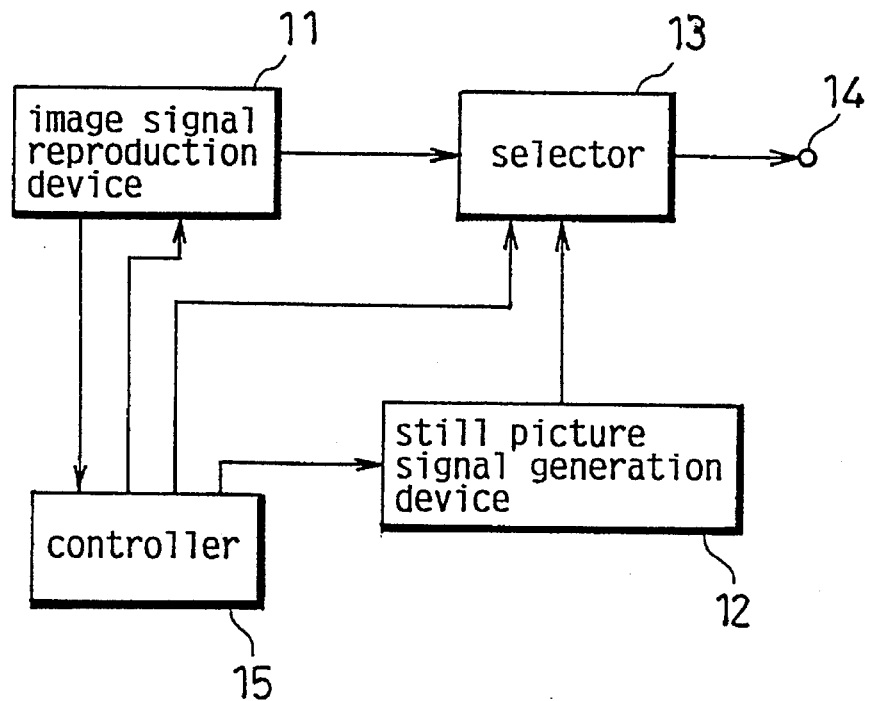
FIG. 1 is a block diagram showing a conventional apparatus for broadcasting the main image and the still picture one after the other.
Figure 2:
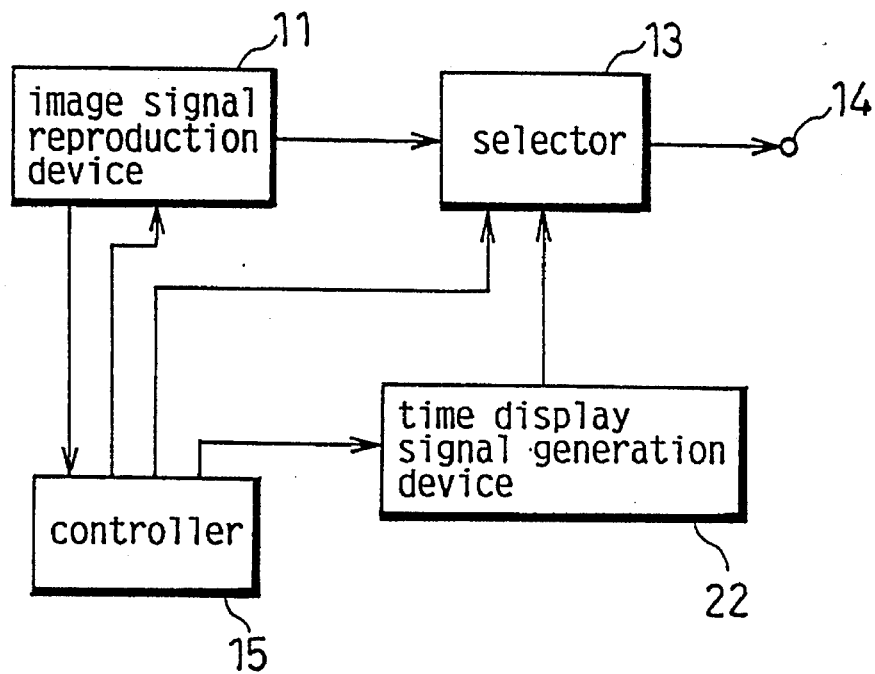
FIG. 2 is a block diagram showing an apparatus designed to broadcast a more useful image at the interval.
Figure 3:
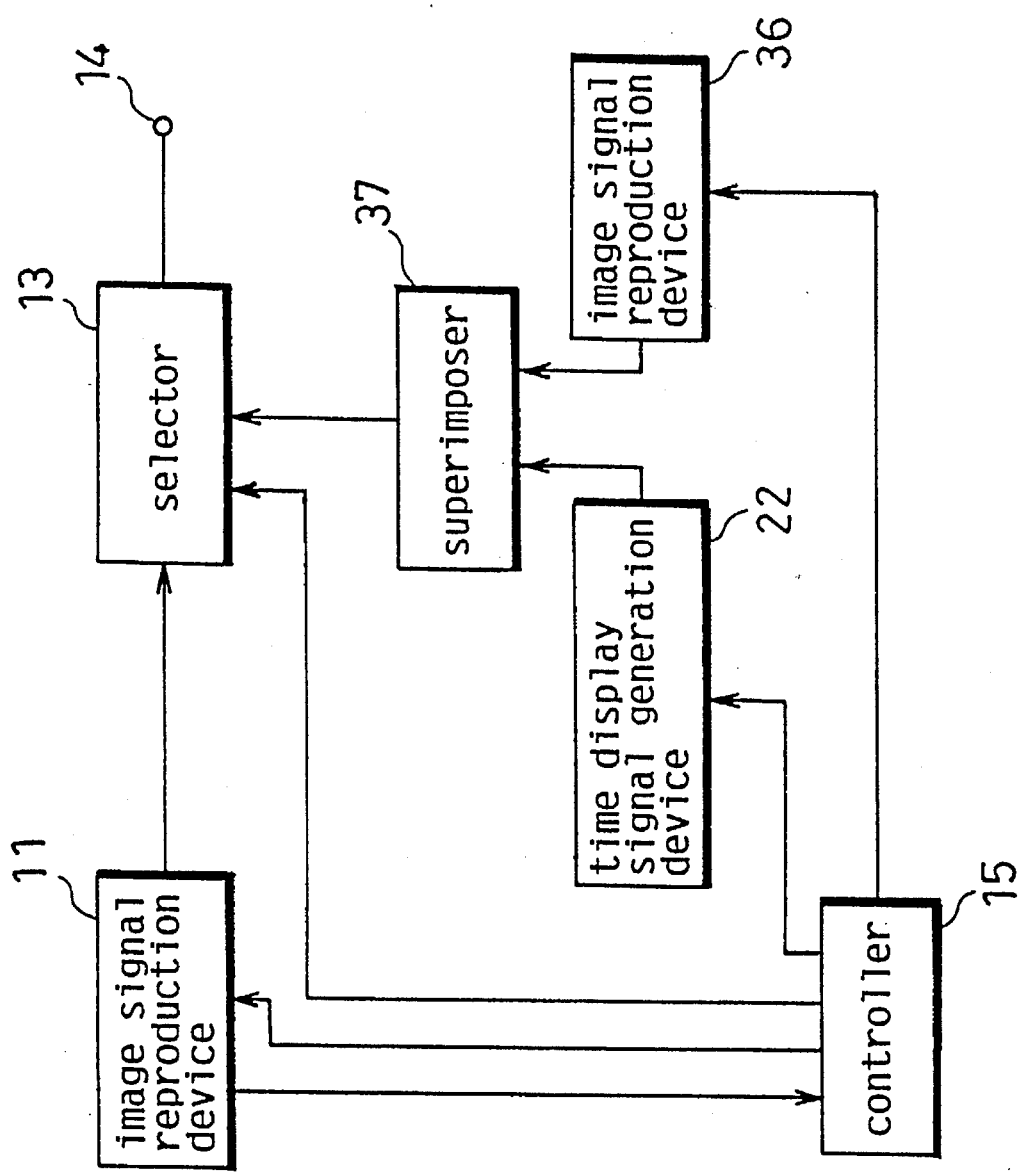
FIG. 3 is a block diagram showing another apparatus designed to broadcast a more useful image at the interval.
Figure 4:
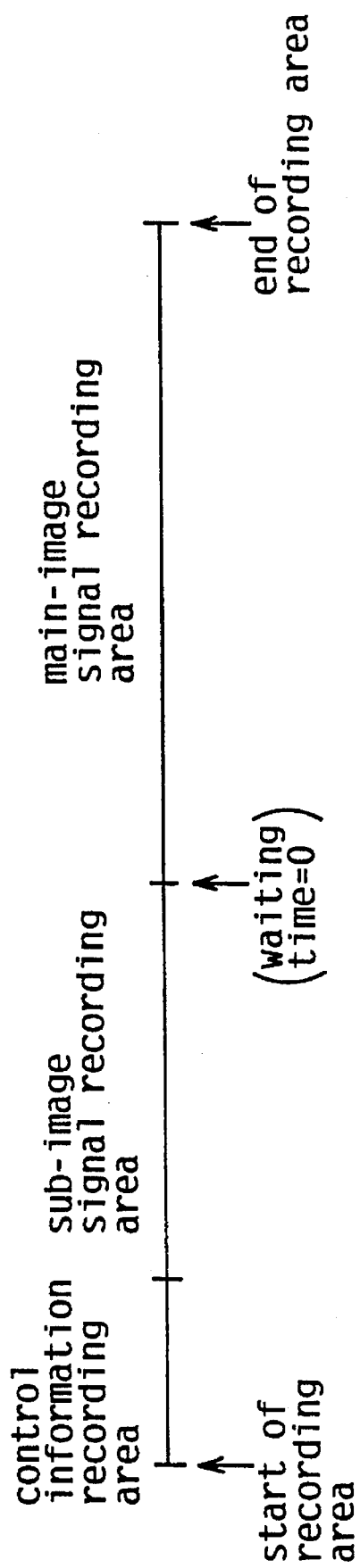
FIG. 4 is an illustration showing a recording format of the optical disc in Embodiment 1 of the present invention.

An optical disc in this embodiment is described hereunder referring to FIG. 4. As shown in the figure the optical disc has a control information area, a sub-image signal recording area and a main image signal recording area. The main image signal recording area holds a signal of a main image to be provided, that is a signal of a program including a series of images. The sub-image signal recording area holds a signal of a sub-image which displays a time counted down to be 0. The main image signal recording area is placed immediately after the sub-image signal recording area. The optical disc constructed as above is utilized by an image transmitting apparatus so that the main image signal and the sub-image signal are reproduced one after the other. To be concrete, the sub-image signal is reproduced to display the waiting time for the next reproduction of the main image signal, and the main image signal reproduction starts when the time 0 is displayed. Additionally, the sub-image is an optical image (e.g. a message saying "continued until next reproduction of the image starts", or a commercial image) with the waiting-time display superimposed thereon. The control information area holds control information including addresses each of which shows a start and an end point of the main image signal recording area, time required for a reproduction of the main image, and addresses each of which corresponds to each point of the time counted down.

Figure 5:
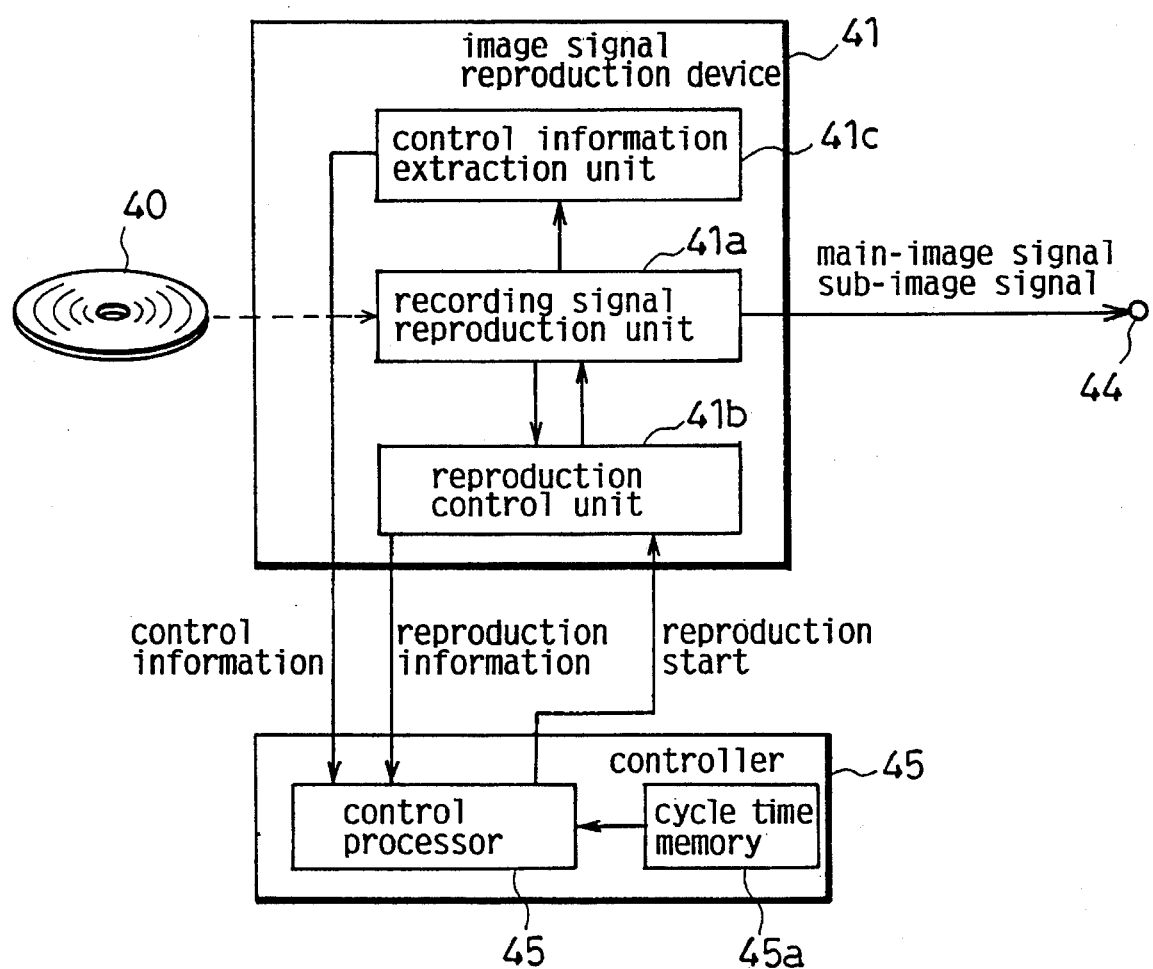
FIG. 5 is a block diagram showing the image signal transmitting apparatus utilizing said optical disc.

The optical disc constructed as above is utilized by the image signal transmitting apparatus constructed as shown in FIG. 5. That is, the transmitting apparatus for transmitting the main signal at the fixed cycle by utilizing the above optical disc is equipped with an image signal reproduction device 41 for outputting the image signal to be transmitted to an output terminal 44, and a control device 45 for controlling the image signal reproduction device 41. Further, the image signal reproduction device 41 has a recording signal reproduction unit 41a for reproducing the signal recorded in the optical disc 40, a reproduction control unit 41b for controlling the recording signal reproduction unit 41a and the like, and a control information extraction unit 41c for extracting the control information from a reproduction signal. The controller 45 further has a cycle time memory 45a for memorizing the cycle at which the main image signal and the sub-image signal are transmitted, and a control processor 45b for outputting a control signal to control the image signal reproduction device 41.

Figure 6:
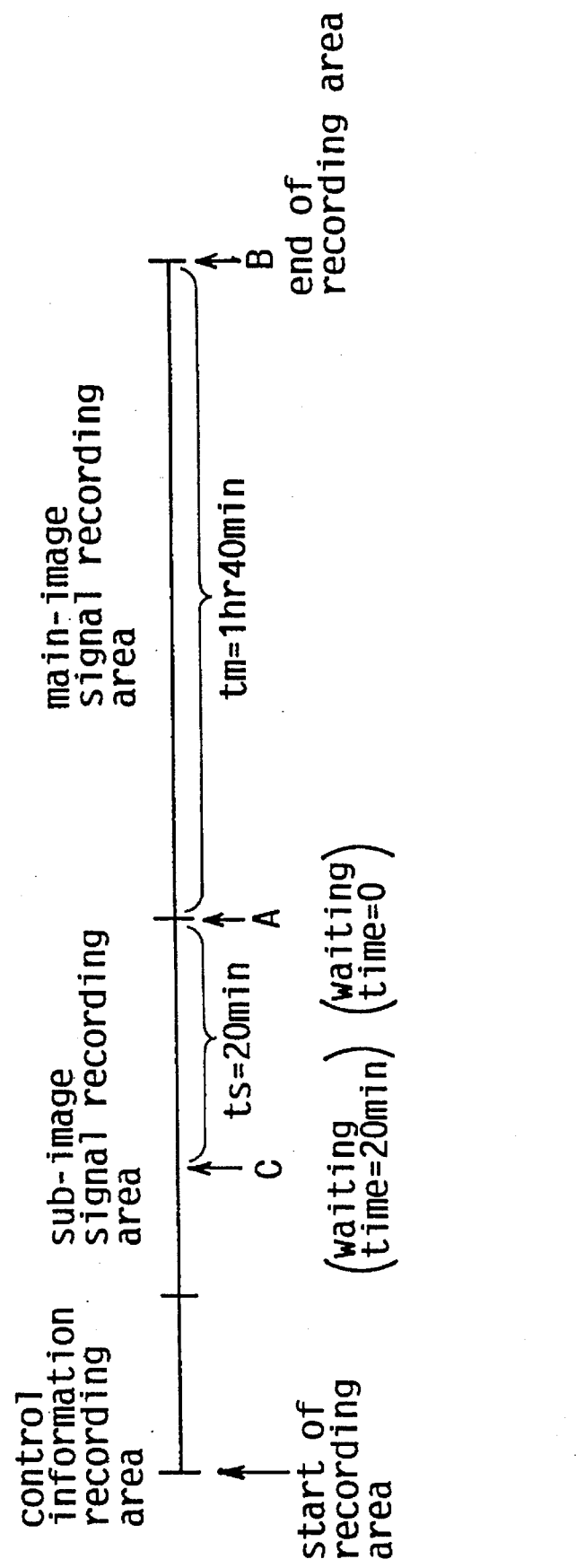
FIG. 6 is an illustration showing a concrete recording format of said optical disc.

An operation of the transmitting apparatus is described hereunder referring to FIG. 6. In this case the apparatus transmits the main image signal at a two-hour cycle by utilizing an optical disc 40 holding the sub-image signal of a 30 minute reproduction and the main image signal of a 100 minute reproduction and also addresses A and B for the start and the end point of the main image reproduction respectively.

The cycle (tc=2 hours) is memorized by the cycle time memory 45a of the control device 45 beforehand. When the optical disc 40 is set to the image signal reproduction device 41, the recording signal reproduction unit 41a reproduces the signal recorded in the control information area, and the control information extraction unit 41c extracts therefrom the control information including the time required for the main image signal reproduction (tm=1 hr 40 min) as well as the addresses each of which corresponds to each point of the time counted down, then transmits the extracted information to the control processor 45b.

The control processor 45b subtracts the time required for the main image signal reproduction (tm) from the cycle (tc) to obtain the time required for the sub-image signal reproduction (ts=20 min), then obtains the address C which is placed ahead of the main image signal recording area by 20 minutes to show the start point of the waiting time display, and holds it. The control processor 45b directs the reproduction control unit 41b to reproduce the main image signal.

According to the direction given thereto, the reproduction control unit 41b controls the recording signal reproduction unit 41a for the main image signal reproduction. Informed with a completion of the reproduction, the control processor 45b directs the reproduction control unit 41b to control the recording signal reproduction unit 41a so that the sub-image reproduction starts with the address C.

Immediately after completing the sub-image signal reproduction which displays the waiting time counted down from 20 min to 0 min, the recording signal reproduction unit 41a reproduces the main image signal. Hereinafter the control processor 45b repeats its control on the image signal reproduction device 41 so that a cycle is repeated, wherein the sub-image signal reproduction starting with the address C and the main image signal reproduction take place one after the other.

Figure 9A:
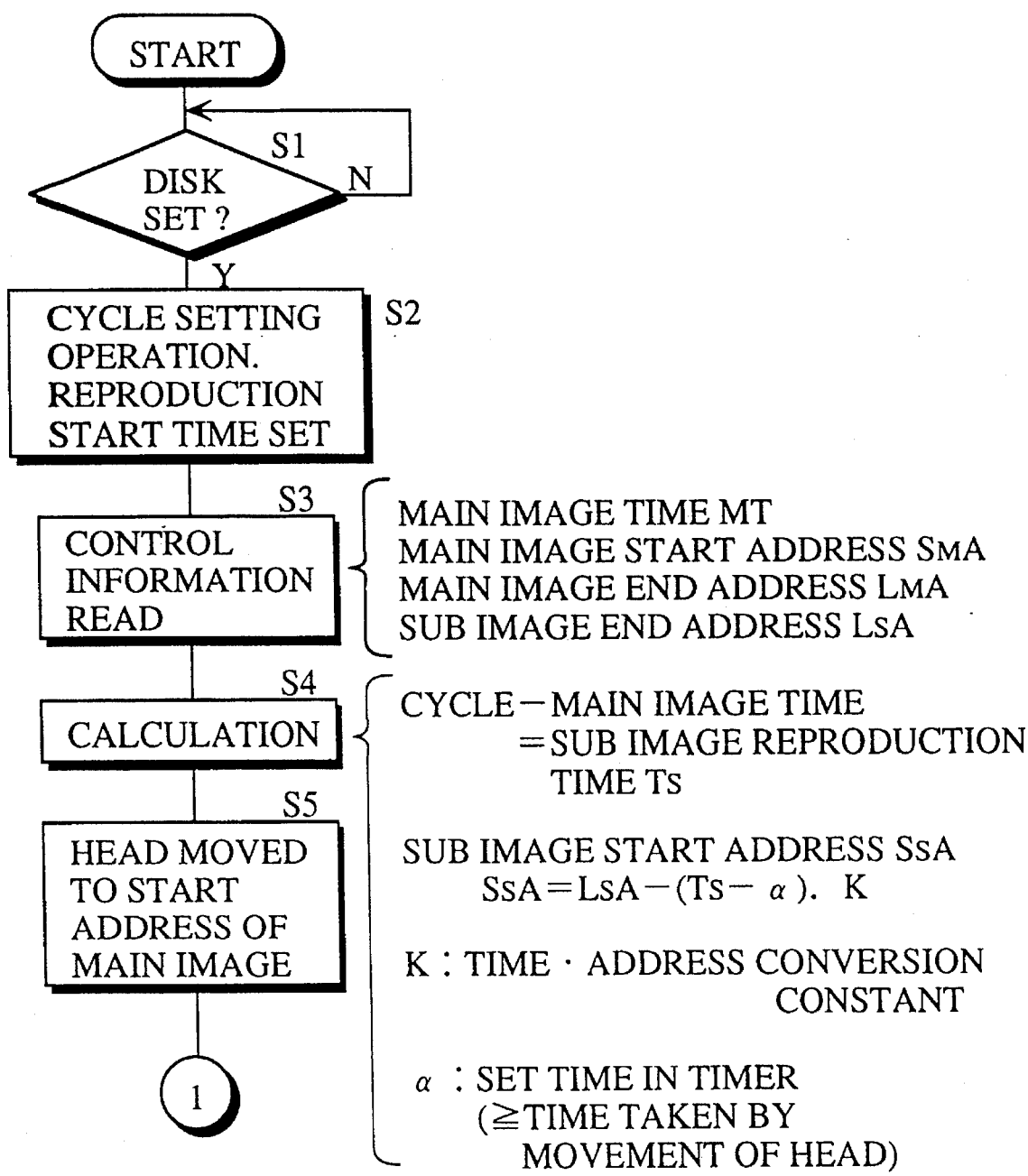
FIGS. 9a, 9b show a flowchart for the operation of the control apparatus 45 in Embodiment 1 of the present invention.
Figure 9B:
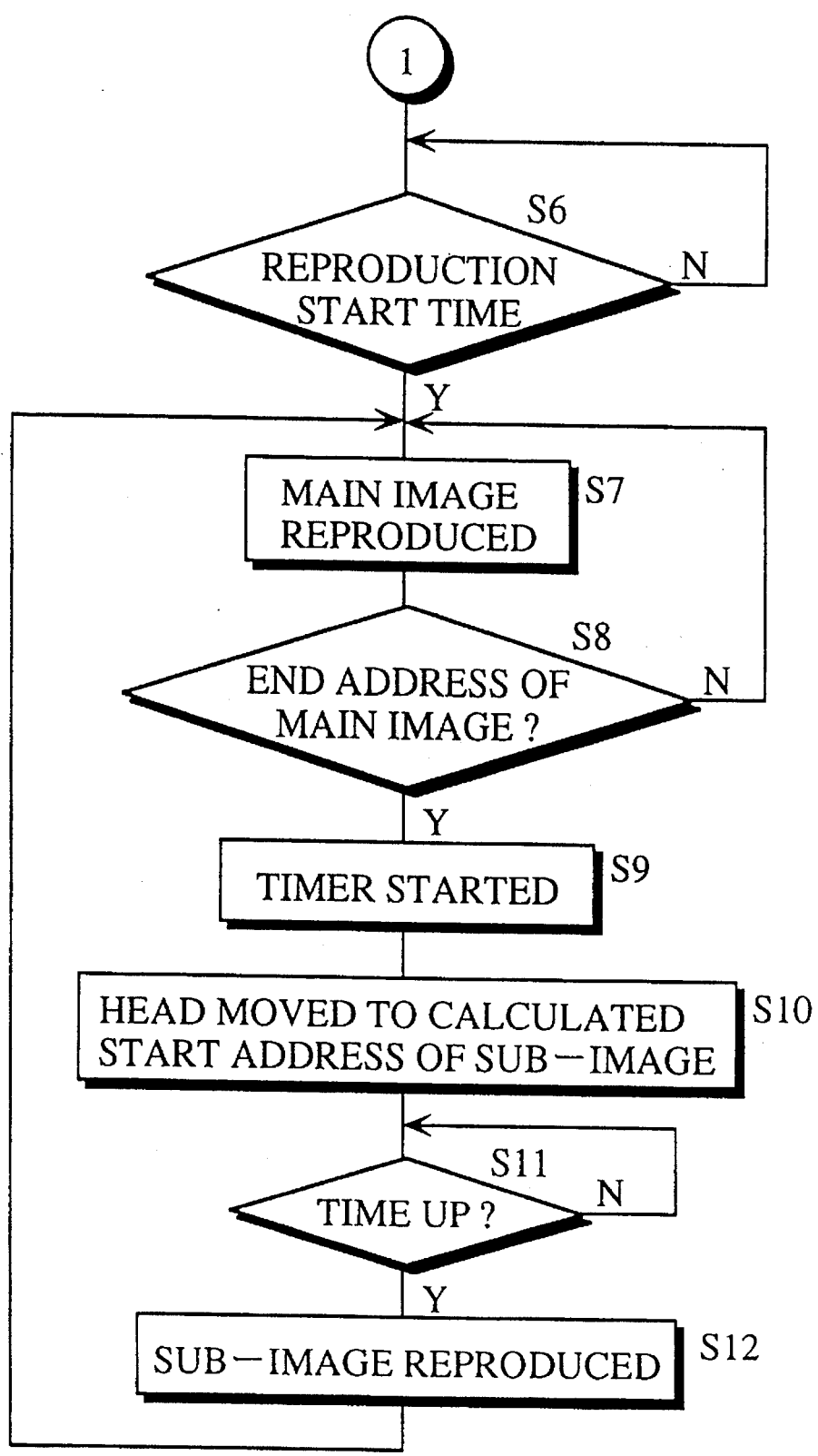

The above operation is executed according to the flowchart for the control apparatus 45 shown in FIGS. 9a, 9b. This flowchart starts when a new disc is set. That is to say, once a new disc 40 has been set in the image reproduction apparatus 41 (S1), if the setting of a new cycle is necessary, than this setting operation is executed first, along with the setting of the reproduction start time (S2). When the setting of a new cycle is unnecessary, then the operation moves on to the next process at the input to the effect that such setting is unnecessary. In such a case, the cycle which is already set is used. In S3, the head is moved to the control information area of the disc, and the necessary control information is read. This necessary control information is composed of the reproduction time for the main image MT, the start address for the main image SmA and the end address LmA, and the end address for the sub-image LsA which is stored on the disc. Other information necessary for reproduction control is already determined in advance and therefore need not stored as part of the control information area on the disc. Once the control information has been read, then the calculation of the reproduction start address of the sub-image is executed based on the retrieved information (S4). The formula used for this calculation is shown below.

$$Ts = CT - MT \tag{1}$$

when Ts is the reproduction time of the sub-image and CT is the cycle.

$$SsA = LsA - (Ts - \alpha) \cdot K \tag{2}$$

when SsA is the start address of the sub-image, K is the time-address conversion coefficient, and $\alpha$ is the set time in the timer.

The above equation (1) finds the reproduction time of the sub-image from the set cycle CT and the main image time read from the control information MT. The start address of the sub-image is then found (LsA−K*Ts) using the reproduction time Ts of the sub-image found by equation (1) and the end address of the sub-image in the control information. That is to say, when the main image storage area and the sub-image storage area come after another as shown in FIG. 4, then, at the end of the reproduction of the main image, the reproduction head has to move across several tracks or between sectors, and, because of this, the head transfer time can take several seconds. Therefore, considering this head transfer time when finding the start address of the sub-image, it becomes necessary to add the address number corresponding to the time thus taken to the logically decided start address (LsA−K*Ts). In this embodiment, a timer with a set time $\alpha$ which is somewhat longer than the expected head transfer time is used, and the start address of the sub-image is found by means of the equation (2). The start address SsA found by the equations (1) and (2) is stored in the registers.

Next, the reproduction head moves to the start address of the main image SmA (S5), and waits until the reproduction start time set in step S2 (S6). Once it becomes the set reproduction start time, then it starts the reproduction of the main image (S7). The reproduction of the main image continues until, in due time, the end address LmA has been reached (S8), when, together with the start of the clock (S9), the reproduction head moves to the start address of the sub-image found by equation (2). Since the set time $\alpha$ is somewhat longer than the expected head transfer time, then the reproduction head reaches the start address SsA for the sub-image and, in due course, the set time expires (S11), at which point the reproduction of the sub-image begins (S12). On this occasion, since in equation (2) the start address of the sub-image is calculated considering the set time in the timer, then the image of the sub-image at the start of reproduction shows the exact time until the start of the main image.

Since the start address of the main image follows after end address LsA of the sub-image in FIG. 4, then the reproduction of the main image starts as soon as the time displayed by the sub-image becomes 0 (S7). From here on, steps S7–S12 are executed and the main image and the sub-image are successively reproduced, until an indication to stop reproduction is received.

[EMBODIMENT 2]

Figure 7:
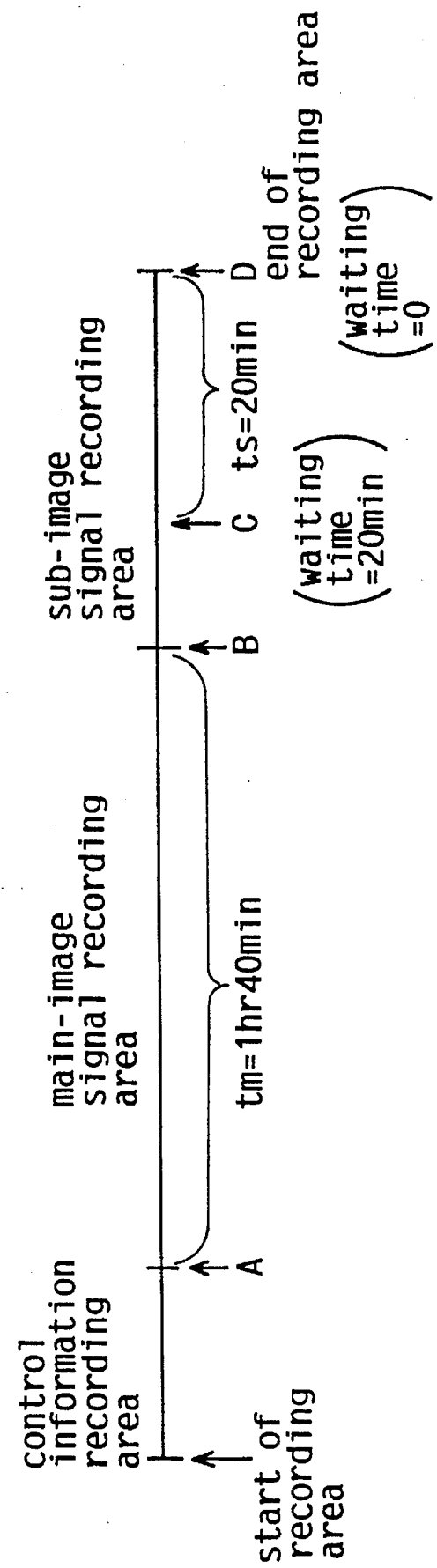
FIG. 7 is an illustration showing a concrete recording format of an optical disc in Embodiment 2 of the present invention.

An optical disc in this embodiment is described hereunder referring to FIG. 7. As shown in the figure the optical disc holds the same signals as in Embodiment 1 except that a main image signal recording area and the sub-image signal recording area are opposite in their placements; first is the main image signal recording area, and the control information area further holds addresses showing a start and an end point of the sub-image signal recording area. The transmitting device for transmitting image signals by utilizing such an optical disc is equipped with the reproducing control unit 41b and the control processor 45b is driven differently from Embodiment 1. That is, informed by the reproduction control unit 41b that the image signal recorded at the address D in the recording area is transmitted to display the time 0, the control processor 45b directs the reproduction control unit 41b to reproduce the main image signal, starting with the address A. The procedure following the main image signal reproduction is substantially the same as embodiment 1.

Besides controlling a start of the sub-image signal reproduction, as in Embodiment 1, the reproduction control unit 41b in this embodiment is also responsible for controlling a main image signal reproduction. The optical disc, however, has an advantage that enables even a general reproduction device to start its operation with the main image reproduction.

Figure 10:
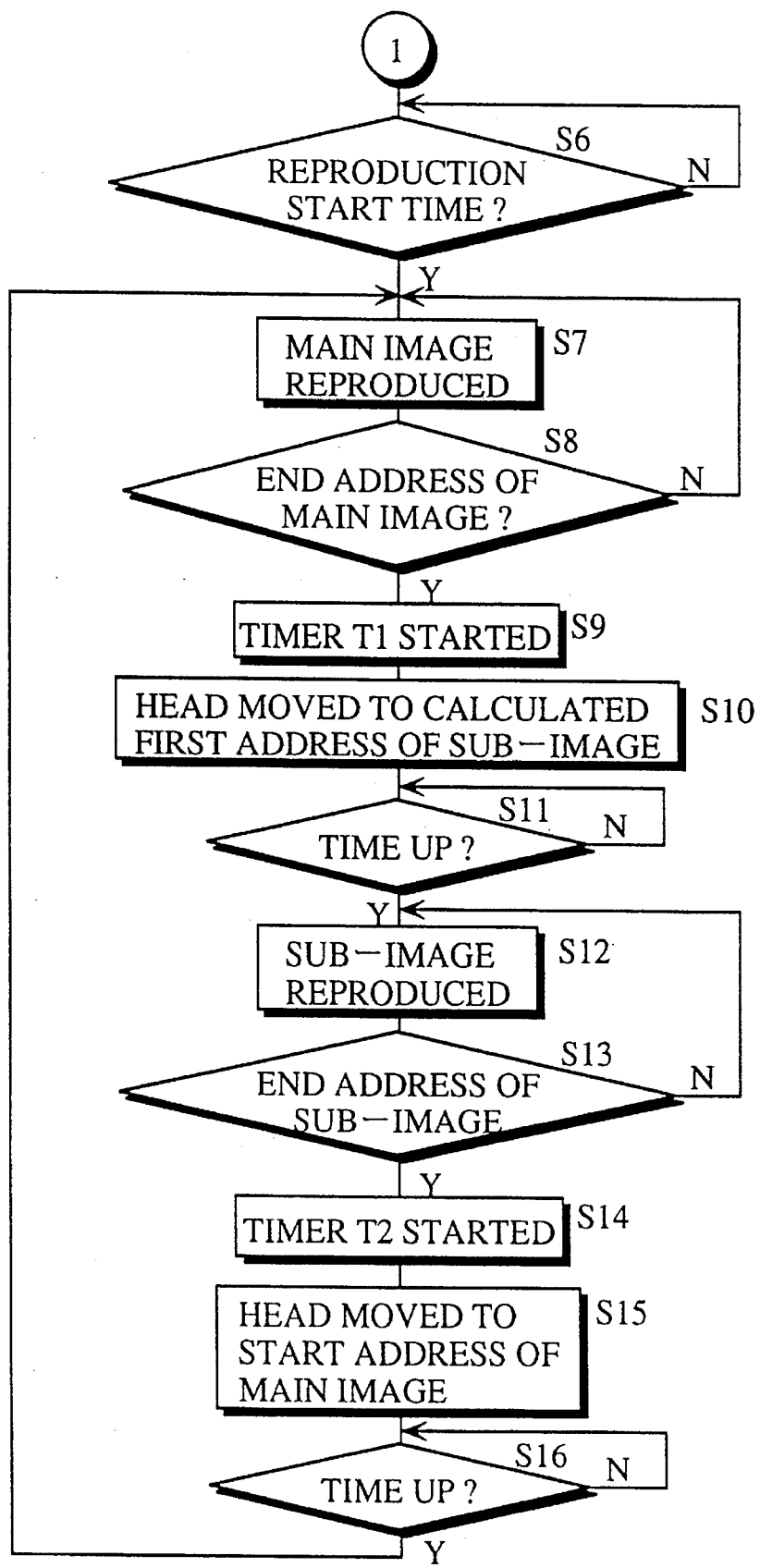
FIG. 10 shows a flowchart for the operation of the control apparatus in Embodiment 2 of the present invention.

The control operation for the control apparatus in this embodiment is shown in FIG. 10. As can be seen, this drawing is essentially the same as the flowchart shown in FIGS. 9a, 9b. That is to say, since the reproduction head has 2 transfer operations in one cycle, first to the start of the sub-image at the end of the reproduction of the main image and then to the start of the main image at the end of reproduction of the sub-image, then, as well as using two timers T1 and T2, there are the additional processes (S13–S16) for transferring to the start address of the main image once the end address in the sub-image has been reached. The timer T1 is set a time which is as long or longer than the time necessary to move the reproduction head from the end address in the main image to the start address of the sub-image. On the other hand, timer T2 is set a time which is as long or longer than the time necessary to move the reproduction head from the end address in the sub-image to the start address of the main image. If the time set in timer T1 is $\alpha$, and the time set in timer T2 is $\beta$, then the equation for this embodiment which is equivalent to equation (2) becomes as follows, $$SsA = LsA - (Ts - \alpha - \beta) \cdot K \tag{3}$$

As with the first embodiment, this embodiment can be constructed so as to function using only one timer. In this case, the set time in the timer is given as $\gamma$, with $\gamma$ being expressed in the following equation, $$\gamma = CT - MT(=Ts) \tag{4}$$

The start address SsA of the sub-image is found according to the following equation, $$SsA = LsA - (\gamma - HT1 - HT2) \tag{5}$$

Here, HT1, HT2 are the time periods somewhat longer than the time taken for the head to move on each of the two occasions. Also, the start of the timer in this case may begin at step S9 in FIG. 10, with the check as to whether the time has expired being executed in S16.

[EMBODIMENT 3]

Another image signal transmitting apparatus for transmitting image signals by utilizing the optical discs in Embodiments 1 and 2 is described hereunder referring to FIG. 8. Such apparatus transmits the sub-image with another optional image superimposed thereon. This is achieved by restricting the sub-image in the optical disc to an image which can be superimposed on another image. For example, the time image is used preferably as the sub-image. Like components are labelled with like reference numerals with respect to the first and second embodiments, and the description of these components is not repeated.

As shown in the figure, the transmitting apparatus is equipped with an image signal reproduction device 56 and an image superimposer 57 besides the image signal reproduction device 41 and the control unit 55.

The image signal reproduction device 56 such as a video tape player or an optical disc reproduction device represented by the image signal reproduction device 41, outputs the image signal to be transmitted at the interval between reproductions of the main image, including a background video, an advertisement for the main image, a commercial image or the like.

The image superimposer 57 superimposes the image reproduced by the image signal reproduction unit 41 on the image reproduced by the image signal reproduction device 56.

The control device 55 controls the image signal reproduction device 41 and the image signal reproduction device 56. More specifically, the controller 55 controls the image signal reproduction device to output the image signal only when the image signal reproduction device 41 reproduces the sub-image signal to be outputted.

The transmitting apparatus described above can superimpose the sub-image on another image; therefore its use increases the general applicability of the optical disc.

Furthermore, a recording medium, which should be an optical disc with a large memory capacity and high durability, may vary in its recording type including a recording by detecting a presence/absence of a pit or recording by detecting a magnetizing direction or an alternation in phase.

Also the time required for the main image signal reproduction may be obtained by converting a difference between the start and the end point of a main image signal recording area from an address into time.

Further, in the above embodiments the reproduction control unit 41b and the control processor 45b/55b function separately from each other, but both can be integrated into a microcomputer equipped with a CPU or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being include therein.

We claim:

1. An image signal transmission apparatus for repeatedly reproducing and transmitting a main image and a sub-image, using an optical disc which has a main image storage area which stores the main image, a sub-image storage area which stores a time display which shows a time progressively counting down until a remaining time is zero, and a control information storage area which stores control information including an end address in the sub-image storage area, a main image reproduction time, and an end address in the main image storage area, comprising:

control information acquisition means for acquiring the end address of the sub-image storage area and the reproduction time, the start address and the end address of the main image from the control information storage area of the optical disc when the optical disc is set;

a timer which is set an expected necessary time for moving a reproduction head;

cycle memory means for storing a cycle which transmits a main image signal;

calculation means for calculating a sub-image reproduction required time from the cycle, the main image reproduction time and the set time in the timer, and at the same time finding a sub-image reproduction start address from the sub-image reproduction required time and the end address in the sub-image storage area;

timer activation means for turning on the timer when data in the end address of the main image has been reproduced by the reproduction head; and control means for moving the reproduction head to the sub-image reproduction start address found by the calculation means when the reproduction head has finished reproducing the end address in the main image, and for starting reproduction again from the sub-image reproduction start address having waited for the set time in the timer to expire.

2. The image signal transmission apparatus of claim 1, wherein the calculation means includes a calculation unit which executes a calculation given below to find the sub-image reproduction start address;

$$Ts = CT - MT \tag{1}$$

$$SsA = LsA - (Ts - \alpha).K \tag{2}$$

when in equation (1), Ts is a time assigned to the reproduction of a sub-image, CT is the cycle, and MT is the main image reproduction time, and in equation (2) SsA is the sub-image reproduction start address, LsA is the end address for the sub-image, K is a coefficient of conversion from time into an address number, and $\alpha$ is the set time in the timer.

3. The image signal transmission apparatus of claim 2, wherein the timer activation means includes an address retrieval unit for retrieving the end address of the main image reproduced by said reproduction head.

4. The image signal transmission apparatus of claim 3, wherein the main image storage area is arranged so as to follow after the sub-image storage area on the optical disc, wherein the time set in the timer is set so as to be at least as long as a time taken for the reproduction head to move from the end address of the main image to the start address of the sub-image.

5. The image signal transmission apparatus of claim 4, further comprising image signal generation means for generating a third image signal aside from the main image and the sub-image; and image superimposing means for superimposing onto the third image generated by the image signal generation means the time image of the sub-image signal;

wherein the control means controls the image signal generation means so as to generate the third image signal, while, in addition, having the sub-image signal reproduced.

6. An image signal transmission apparatus for repeatedly reproducing and transmitting a main image and a sub-image, using an optical disc which has a main image storage area which stores the main image, a sub-image storage area which stores a time display which shows a time progressively counting down until a remaining time is zero, and a control information storage area which stores control information including an end address in the sub-image storage area, a main image reproduction time, and an end address in the main image storage area, with the sub-image storage area arranged so as to come after the main image storage area, comprising:

control information acquisition means for acquiring the end address of the sub-image storage area and the reproduction time, the start address and the end address of the main image from the control information storage area of the optical disc when the optical disc is set;

a first timer for being set a time which is at least as long as a time taken to move a reproduction head from the main image to the sub-image;

a second timer for being set a time which is as least as long as a time taken to move the reproduction head from the sub-image to the main image;

cycle storage means for storing a cycle for sending a main image signal;

calculation means for calculating a sub-image reproduction required time from the cycle, the main image reproduction time and the set times in the first and second timers, and at the same time finding a sub-image reproduction start address from the sub-image reproduction required time and the end address in the sub-image storage area;

timer activation means for activating the first timer when the reproduction head has reproduced data in the end address of the main image, and for activating the second timer when the reproduction head has reproduced data in the end address of the sub-image; and control means for moving the reproduction head to the sub-image reproduction start address found by the calculation means and, having waited for the set time in the first timer, starting reproduction of data at the sub-image reproduction start address, when the reproduction head has finished the reproduction of the end address of the main image, and for moving the reproduction head to the reproduction start address of the main image and, having waited for the set time in the second timer, starting the reproduction of data at the main image start address, when the reproduction head has finished the reproduction of the end address of the sub-image.

7. The image signal transmission apparatus of claim 6, wherein the calculation means includes a calculation unit which executes a calculation given below to find the sub-image reproduction start address;

$$Ts = CT - MT \tag{3}$$

$$SsA = LsA = (Ts - \alpha - \beta).K \tag{4}$$

when in equation (3), Ts is the sub-image reproduction required time, CT is the cycle, and MT is the reproduction time of the main image, and in equation (4) SsA is the sub-image reproduction start address, LsA is the sub-image end address, K is a coefficient for a conversion from time into an address number, $\alpha$ is the set time in the first timer and $\beta$ is the set time in the second timer.

8. The image signal transmission apparatus of claim 7, wherein the timer activation means includes an address retrieval unit for retrieving the end address of the main image and the sub-image reproduced by said reproduction head.

9. The image signal transmission apparatus of claim 8, further comprising:

image signal generation means for generating a third image signal aside from the main image and the sub-image; and image superimposing means for superimposing onto the third image generated by the image signal generation means the time image of the sub-image signal;

wherein the control means controls the image signal generation means so as to generate the third image signal, while, in addition, having the sub-image signal reproduced.

10. An image signal transmission apparatus for repeatedly reproducing and transmitting a main image and a sub-image, using an optical disc which has a main image storage area which stores the main image, a sub-image storage area which stores a time display which shows a time progressively counting down until a remaining time is zero, and a control information storage area which stores control information including an end address in the sub-image storage area, a main image reproduction time, and an end address in the main image storage area, with the sub-image storage area arranged so as to come after the main image storage area, comprising:

control information acquisition means for acquiring the end address of the sub-image and the reproduction time, the start address and the end address of the main image from the control information storage area of the optical disc when the optical disc is set;

cycle storage means for storing a cycle for transmitting a main image signal;

a timer which is set a time difference between the cycle and the reproduction time of the main image;

calculation means for calculating a calculated sub-image reproduction required time from the cycle, the reproduction time of the main image, the set time in the timer and a time longer than a time to move a reproduction head from the main image to the sub-image as well as a time longer than a time to move the reproduction head from the sub-image to the main image, and for finding a reproduction start address for the sub-image from the end address in the sub-image storage area and the calculated sub-image reproduction required time;

timer activation means for activating the timer when the reproduction head has reproduced the end address of the main image;

control means for moving the reproduction head to the reproduction start address of the sub-image found by the calculation means and starting the reproduction of data at the reproduction start address of the sub-image, when the reproduction head has finished the reproduction of the end address of the main image, and for moving the reproduction head to the reproduction start address of the main image and, having waited for the set time in the timer, starting the reproduction of data at the start address of the main image, when the reproduction head has finished the reproduction of the end address of the sub-image.

11. The image signal transmission apparatus of claim 10, wherein the timer is set a time taken between a reproduction of the last address of the main image and a next reproduction of the starting address of the main image, and wherein the calculation means includes a calculation unit which executes a calculation given below to find the reproduction start address;

$$\gamma = CT - MT(=Ts) \tag{5}$$

$$SsA = LsA - (\gamma - HT1 - HT2) \cdot K \tag{6}$$

when in equation (5), $\gamma$ is a time set in the timer, CT is the cycle, and MT is the reproduction time of a main image, and in equation (6), SsA is the reproduction start address of the sub-image, LsA is the end address for the sub-image, HT1 is a time period somewhat longer than a time taken by the reproduction head to move from the main image to the sub-image, HT2 is a time period somewhat longer than a time taken by the reproduction head to move from the sub-image to the main image, and K is a coefficient for conversion from time into an address number.

12. The image signal transmission apparatus of claim 10, wherein the timer activation means includes a retrieval unit for retrieving the end address of one of the images read by said reproduction head.

13. The image signal transmission apparatus of claim 12, further comprising;

image signal generation means for generating a third image signal aside from the main image and the sub-image; and image superimposing means for superimposing onto the third image generated by the image signal generation means the time image of the sub-image signal;

wherein the control means controls the image signal generation means so as to generate the third image signal, while, in addition, having the sub-image signal reproduced.

* * * * *